(12) United States Patent
Dubas

(10) Patent No.: US 9,566,926 B1
(45) Date of Patent: Feb. 14, 2017

(54) WHEEL GUARD

(71) Applicant: Bryan D. Dubas, Fullerton, NE (US)

(72) Inventor: Bryan D. Dubas, Fullerton, NE (US)

( * ) Notice: Subject to any disclaimer, the term of this patent is extended or adjusted under 35 U.S.C. 154(b) by 70 days.

(21) Appl. No.: 14/822,424

(22) Filed: Aug. 10, 2015

(51) Int. Cl.
   *B60B 33/00* (2006.01)
   *B60R 19/54* (2006.01)
   *B60P 3/077* (2006.01)
   *B60T 3/00* (2006.01)
   *B60T 1/14* (2006.01)

(52) U.S. Cl.
   CPC ............ *B60R 19/54* (2013.01); *B60B 33/0049* (2013.01); *B60P 3/077* (2013.01); *B60T 1/14* (2013.01); *B60T 3/00* (2013.01); *Y10T 16/216* (2015.01)

(58) Field of Classification Search
   CPC .............. B60T 3/00; B60T 1/14; B60P 3/077; B60B 33/0049; Y10T 16/216
   USPC .................................... 188/32, 36; 16/18 CG
   See application file for complete search history.

(56) References Cited

U.S. PATENT DOCUMENTS

| | | | |
|---|---|---|---|
| 394,310 A * | 12/1888 | Sullivan .............. | B60B 33/0002 16/18 CG |
| 2,046,384 A | 7/1936 | Katcher | |
| 2,450,062 A * | 9/1948 | Voss ......................... | A47L 9/009 16/18 CG |
| 2,471,958 A | 5/1949 | Humphreys | |
| 2,830,545 A * | 4/1958 | Robinson ................ | B60B 33/00 105/170 |
| 3,345,675 A * | 10/1967 | Haydock ................ | B60B 33/00 16/18 CG |
| 3,441,974 A * | 5/1969 | Dean ..................... | A47B 91/028 16/18 R |
| 4,025,099 A | 5/1977 | Virden | |
| 4,700,430 A * | 10/1987 | Raftery .................. | A47B 91/06 16/18 CG |
| 4,800,617 A * | 1/1989 | Yeh ...................... | B60B 33/0089 16/18 CG |
| 5,001,808 A * | 3/1991 | Chung .................... | B60B 33/06 16/18 CG |
| 5,134,753 A * | 8/1992 | Rekuc ...................... | A45C 5/14 16/18 CG |
| 5,371,920 A | 12/1994 | Rainville | |
| 5,615,450 A | 4/1997 | Butler | |
| 5,873,144 A | 2/1999 | Tupper et al. | |
| 7,810,769 B2 * | 10/2010 | Williams ............... | A47B 91/00 248/188.1 |
| 8,484,801 B2 * | 7/2013 | Li ............................ | B60B 7/02 16/18 CG |

(Continued)

*Primary Examiner* — Thomas Irvin
(74) *Attorney, Agent, or Firm* — Dennis L. Thomte; Thomte Patent Law Office LLC

(57) ABSTRACT

A wheel guard or skirt is disclosed for use with a wheel of a machine or appliance. The wheel guard is designed to push an obstruction such as a wire, cable or other debris away from the wheel as the machine is moved along a floor. The wheel guard includes a first base member, having first and second ends, a second base member, having first and second ends, an upstanding first end member positioned between the first ends of the first and second base members and an upstanding second end member positioned between the second ends of the first and second base members. The wheel guard is designed to push obstructions away from the wheel to prevent the wheel from running over the obstruction. The wheel guard may be of one-piece construction.

9 Claims, 6 Drawing Sheets

(56) References Cited

U.S. PATENT DOCUMENTS 8,904,597 B2 * 12/2014 Long .................. B60B 33/0015
16/18 CG
9,108,462 B1 * 8/2015 Stone ................. B60B 33/0023

* cited by examiner

WHEEL GUARD

BACKGROUND OF THE INVENTION

Field of the Invention

This invention relates to wheel guards or skirts for the wheels of a machine or appliance such as a portable welding machine, hospital appliance, etc., intended to clear obstacles such as electrical wires, cables, or debris from the rolling path of the wheels thereof so as to prevent obstruction of the rolling movement of the wheels.

Description of the Related Art

Many machines, such as portable welding machines, are mounted on a pair of caster wheels at the forward end thereof and a pair of conventional wheels at the rearward end thereof. In some welding machines, a pair of caster wheels are mounted at the forward end of the welding machine and a pair of caster wheels are mounted at the rearward end of the welding machine. In many welding facilities, the floor thereof is littered with electrical wires, cables, etc., which impede the movement of the wheeled welding machine. Further, many appliances such as hospital carts, IV supports, etc., suffer the same problem.

Attempts have been made to reduce or eliminate these problems. However, the prior art devices are believed to be difficult to mount on the wheels and do not perform satisfactorily. Further, the prior art devices are not usable in many situations such as where the caster wheels have locking devices associated therewith. Further, in some situations, the prior art devices cannot be used when the associated wheel is positioned closely adjacent the welding machine, appliance, etc. Additionally, some of the prior art devices are difficult to install and are difficult to service or remove. Even more particularly, many of the prior art devices are ineffective.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A guard or a skirt is disclosed for a wheel which is rotatably mounted on a machine with the wheel having a horizontal axis. The machine may be a welding machine or other portable machine or appliance. The guard includes a horizontally disposed first base member having a first end, a second end, a lower end and an upper end. The first base member is positioned at one side of the wheel. A horizontally disposed second base member having a first end, a second end, a lower end and an upper end is horizontally spaced from the first base member and is positioned at the other side of the wheel. The upper ends of the first and second base members dwell in a plane below the horizontal axle of the associated wheel.

An upstanding first end member having a lower end, an upper end, a first side, a second side, an outer end wall with lower and upper ends, and an inner end wall with lower and upper ends is also provided. The outer end wall of the first end member extends upwardly and inwardly from the lower end thereof to the upper end thereof. The inner end wall of the first end member extends upwardly and inwardly from the lower end thereof to the upper end thereof. The lower end of the first end member is positioned between the first ends of the first and second base members. The upper end of the first end member dwells in a plane above the upper ends of the first and second base members. The guard also includes an upstanding second end member having a lower end, an upper end, a first side, a second side, an outer end wall with upper and lower ends, and an inner end wall with lower and upper ends. The outer end wall of the second end member extends upwardly and inwardly from the lower end thereof to the upper end thereof. The inner end wall of the second end member extends upwardly and inwardly from the lower end thereof to the upper end thereof. The lower end of the second end member is positioned between the second ends of the first and second base members. The upper end of the second end member dwells in a plane above the upper ends of the first and second base members. The upper ends of the inner end walls of the first and second end members dwell in a plane above the horizontal axis of the wheel. The upper ends of the inner end walls of the first and second end members are spaced-apart a distance which is less than the diameter of the associated wheel.

In the preferred embodiment, the first ends of the first and second base members are selectively removably secured to the first end member and wherein the second ends of the first and second base members are selectively removably secured to the second end member. Preferably, the first ends of the first and second base members are selectively removably snap-fitted to the first end member and wherein the second ends of the first and second base members are selectively removably snap-fitted to the second end member.

In another embodiment, the guard may be comprised of a one-piece molded guard. In another embodiment, the components of the wheel guard may be screwed together or bolted together.

A principal object of the invention is to provide an improved guard or skirt for a caster wheel or a conventional wheel mounted on a portable machine such as a welding machine, appliance or the like.

A further object of the invention is to provide a guard of the type described which prevents the wheels of the machine from rolling over cables, wires, debris, etc.

A further object of the invention is to provide a wheel guard of the type described which may be used with a caster wheel having a lock or a conventional caster wheel or a conventional wheel.

A further object of the invention is to provide a wheel guard of the type described which is easily mounted on a wheel.

A further object of the invention is to provide a wheel guard which is of a one-piece plastic molded construction.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
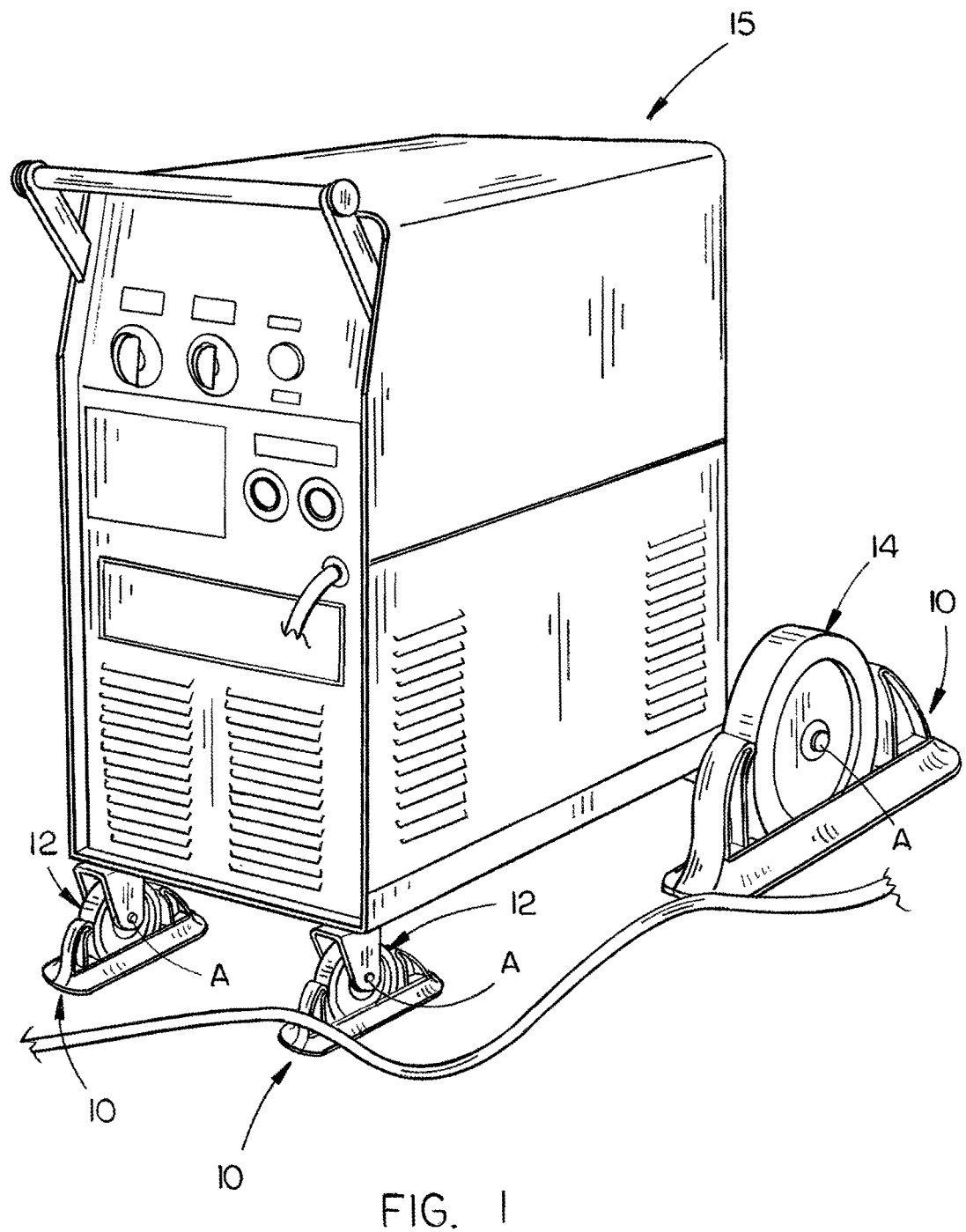
FIG. 1 is a perspective view of a welding machine having caster wheels and conventional wheels mounted thereon with the wheel guard of this invention mounted on the wheels thereof.
Figure 2:
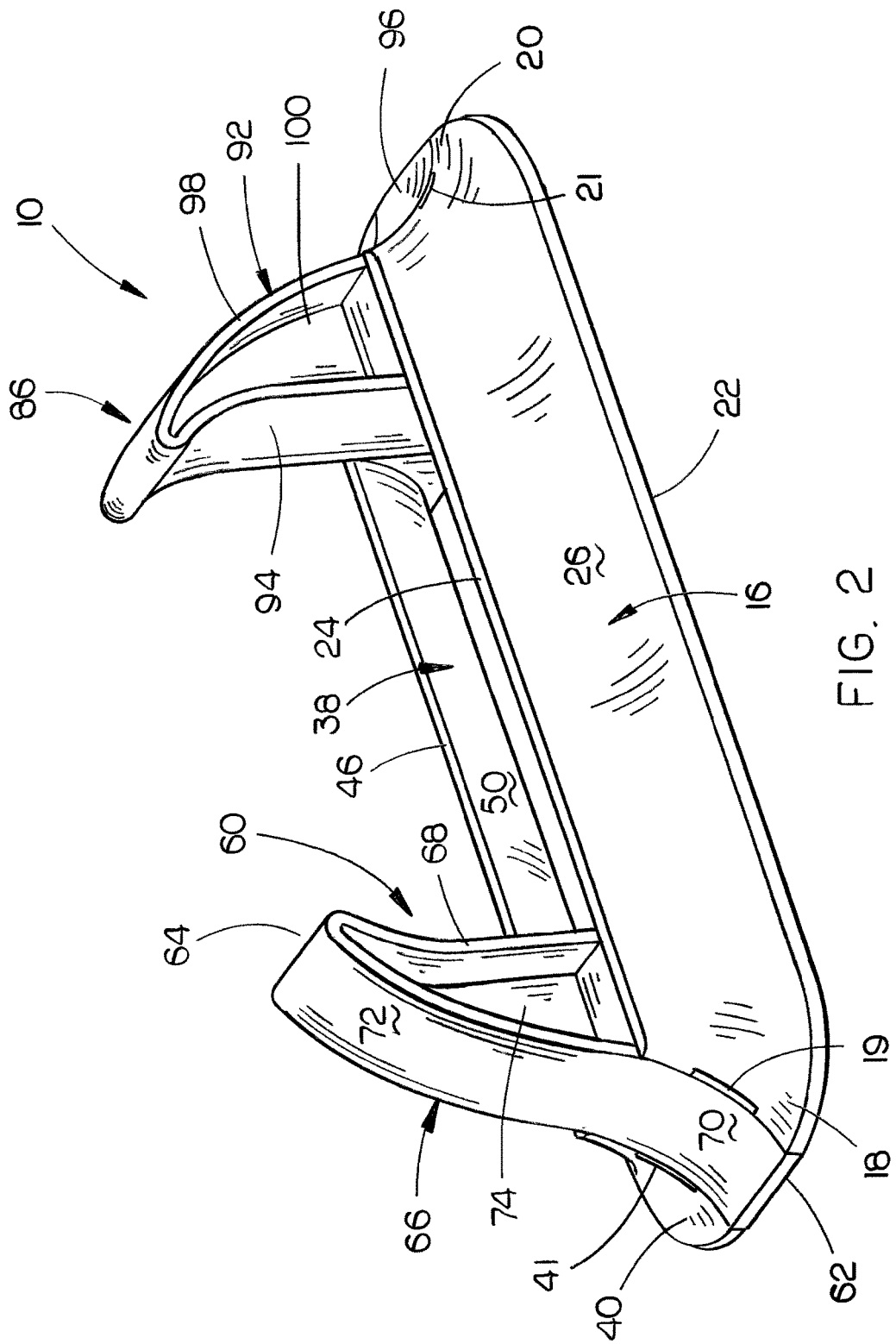
FIG. 2 is a perspective view of the wheel guard of this invention.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to the wheel guard of this invention. The wheel guard 10 is preferably constructed of a plastic material. The wheel guard 10 is designed so as to be usable with a caster wheel, a caster wheel with a brake, and a conventional wheel. Although the drawings illustrate the wheel guard 10 as being of four-piece construction, the wheel guard 10 may be a single piece plastic molded article. The drawings illustrate the wheel guard being used with caster wheels 12 and conventional wheels 14 on a welding machine 15. The size of wheel guard 10 will depend on the size of the wheel. Each of the wheels have a horizontal axle A.

Guard 10 includes an elongated base member 16 having a curved first end 18, a curved second end 20, a lower end 22, an upper end 24, an outer side 26 and an inner side 28. The outer end of first end 18 has a notch 19 formed therein. The outer end of second end 20 has a notch 21 formed therein. As seen, the outer side 26 of base member 16 is curved so as to extend upwardly and inwardly from its lower end 22 to its upper end 24.

Figure 3:
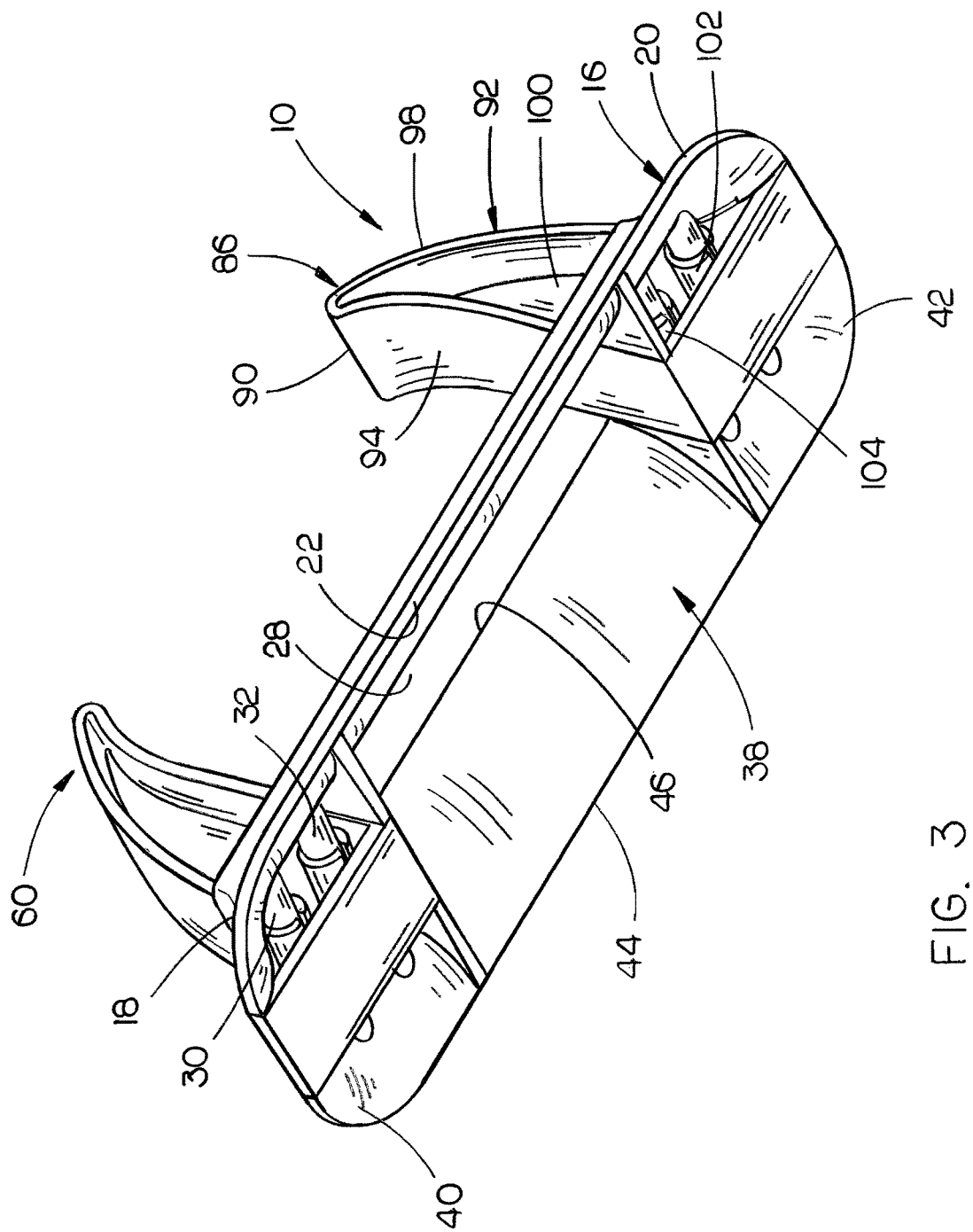
FIG. 3 is a lower perspective view of the wheel guard of this invention.
Figure 5:
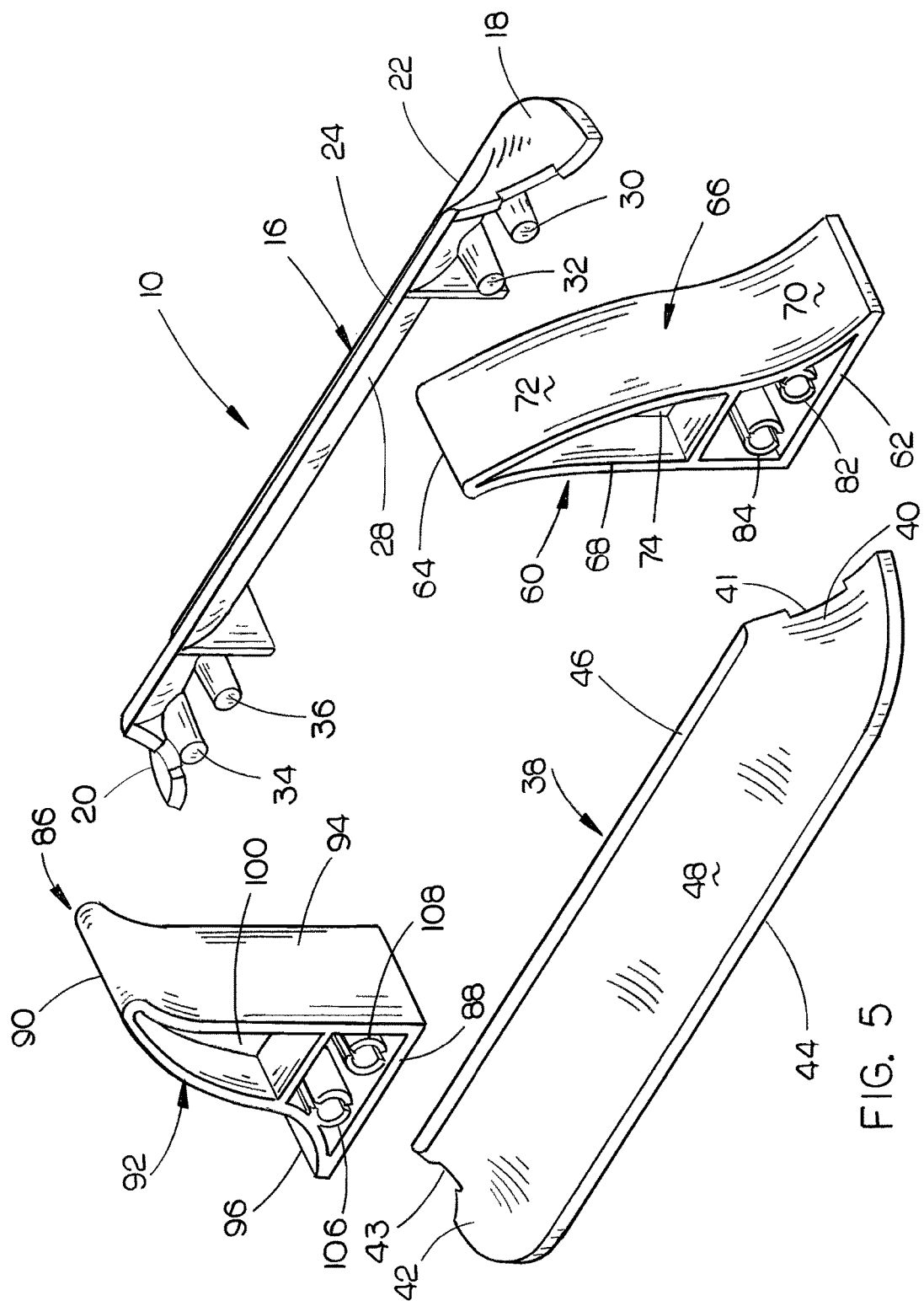
FIG. 5 is an exploded perspective view of the wheel guard of this invention as seen from the opposite side of FIG. 4.
Figure 6:
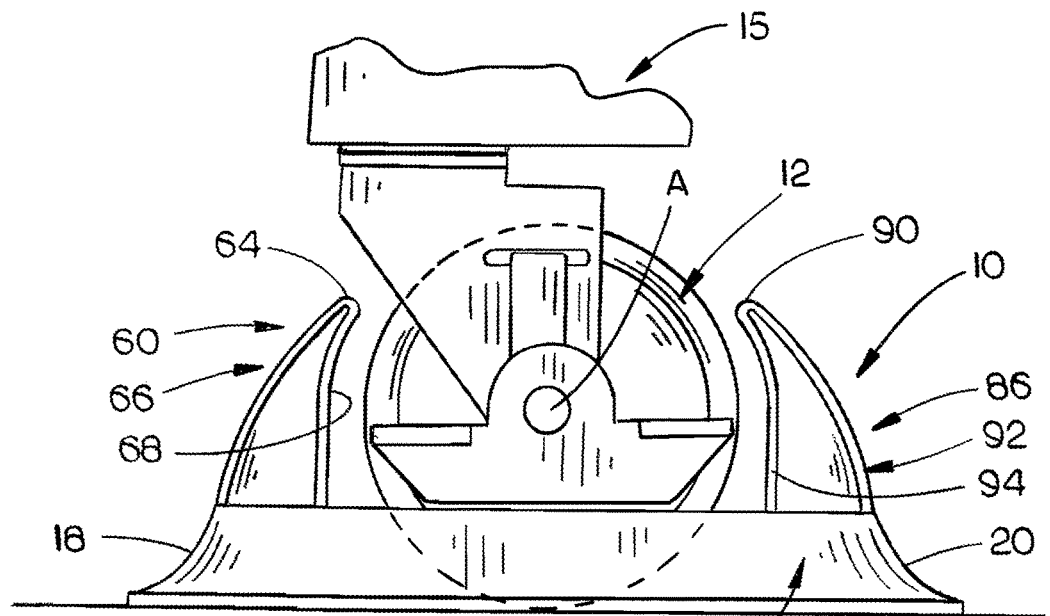
FIG. 6 is a partial side elevational view illustrating the wheel guard of this invention resting on a floor and embracing the wheel of the machine.
Figure 7:
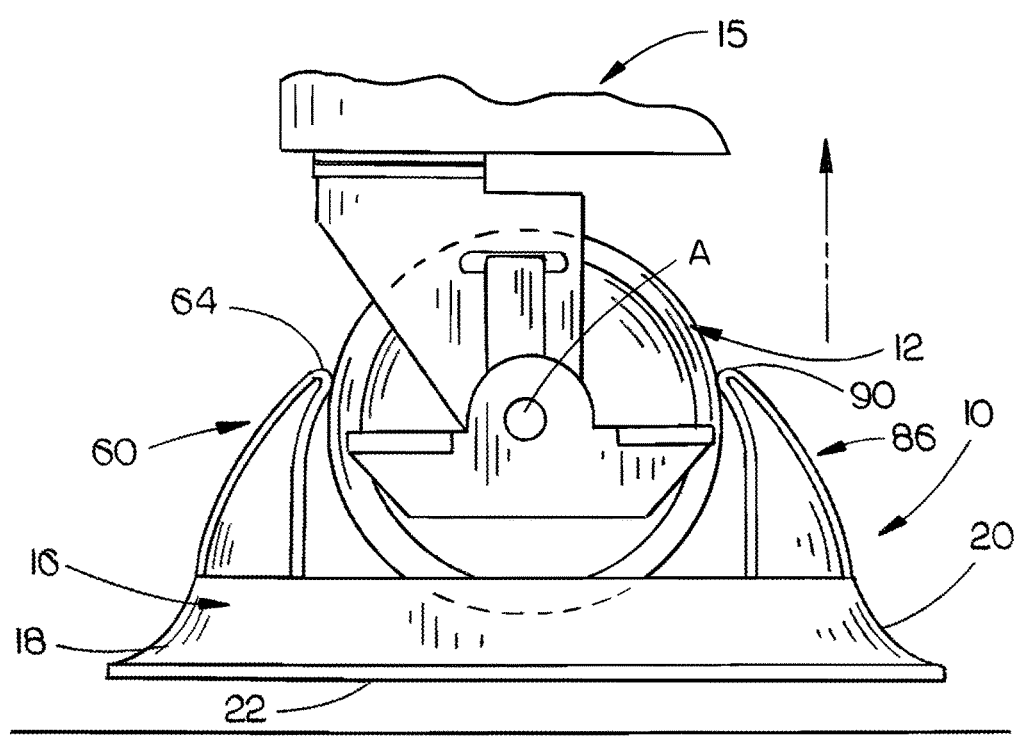
FIG. 7 is a view similar to FIG. 6 except that the machine has been moved upwardly with respect to the floor with the wheel guard of this invention moving upwardly with the wheel.

As seen in FIGS. 3 and 5, a pair of spaced-apart pegs, stubs or studs 30 and 32 extend horizontally inwardly from the inner side 28 of base member 16 inwardly of end 18 thereof. Preferably, studs 30 and 32 are tapered as seen in FIG. 5. A pair of spaced-apart pegs, stubs or studs 34 and 36 extend horizontally inwardly from the inner side 28 of base member 16 inwardly of end 20 thereof. Preferably, studs 34 and 36 are tapered as seen in FIG. 5.

Guard 10 also includes an elongated base member 38 having a curved first end 40, a curved second end 42, a lower end 44, an upper end 46, an outer side 48 and an inner side 50. The outer end of first end 40 has a notch 41 formed therein. The outer end of second end 42 has a notch 43 formed therein. As seen, the outer side 48 of base member 38 is curved so as to extend upwardly and inwardly from its lower end 44 to its upper end 46.

Figure 4:
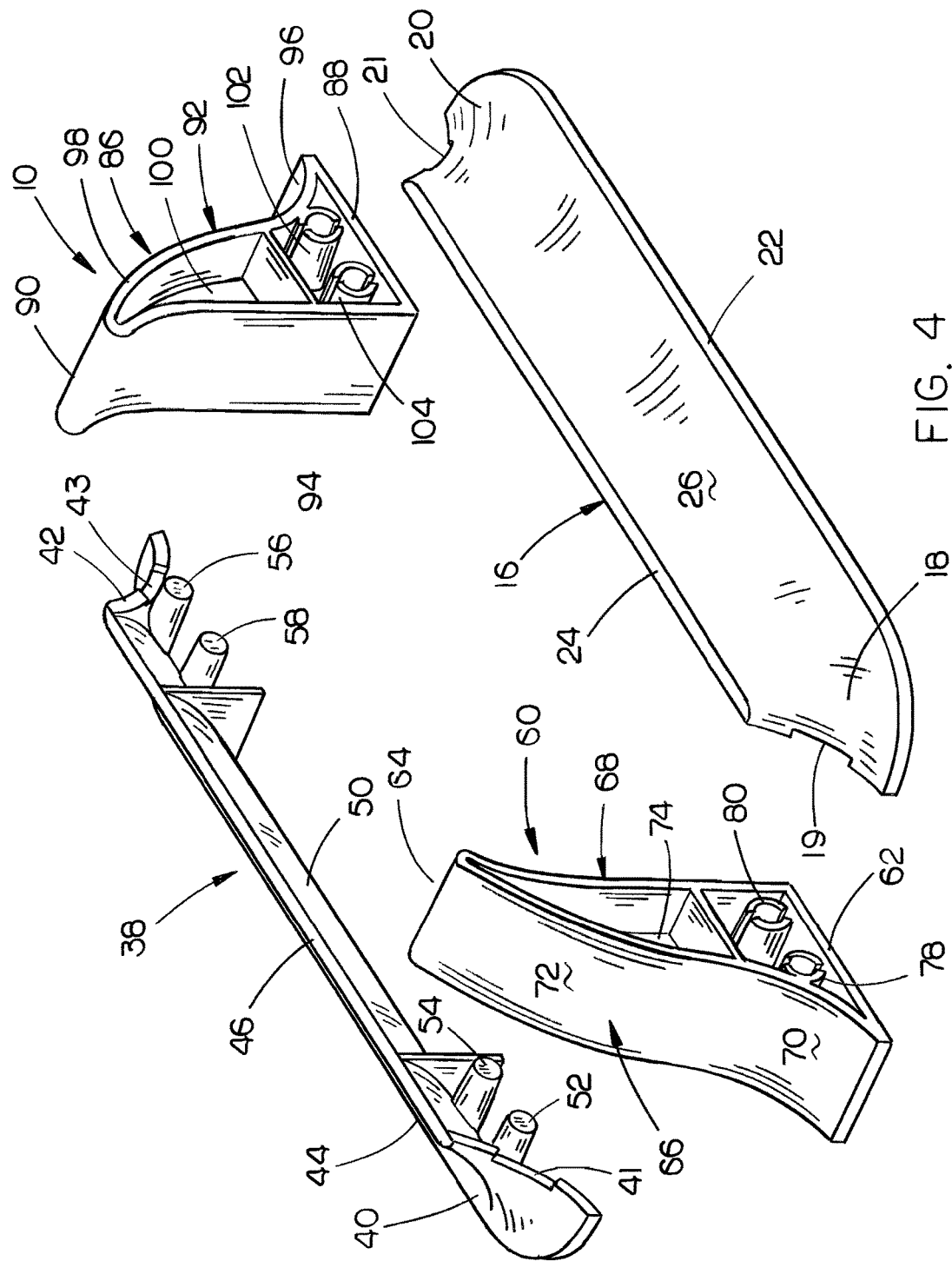
FIG. 4 is an exploded perspective view the wheel guard of this invention.

As seen in FIG. 4, a pair of spaced-apart stubs, pegs or studs 52 and 54 extend horizontally inwardly from the inner side 50 of base member 38 inwardly of end 40 thereof. Preferably, studs 52 and 54 are tapered as seen in FIG. 4. A pair of spaced-apart stubs, pegs or studs 56 and 58 extend horizontally inwardly from the inner side 50 of base member 38 inwardly of end 42. Preferably, studs 56 and 58 are tapered as seen in FIG. 4.

The numeral 60 refers to an upstanding end member which is positioned between the ends 18 and 40 of base members 16 and 38 respectively as will be described in detail hereinafter. End member 60 will be described as having a flat lower end 62, an upper end 64, a curved outer side wall 66 and an inner side wall 68 which is curved at its upper end. As seen, the outer side wall 66 of end member 60 has a curved portion 70 at its lower end. The outer side wall 66 of end member 60 has a curved portion 72 which extends upwardly and inwardly from curved portion 70. End member 60 has a central partition wall 74 which extends between the outer side wall 66 and the inner side wall 68. A pair of hollow tubes 78 and 80 extend horizontally outwardly from one side of wall 74 at the lower end thereof. As will be explained hereinafter, the outer end of tube 78 is configured to receive stud 30 therein and the outer end of tube 80 is configured to receive stud 32 therein. A pair of hollow tubes 82 and 84 extend horizontally outwardly from the other side of wall 74 at the lower end thereof as will be explained hereinafter. The outer end of tube 82 is configured to receive stud 52 of base member 38 therein and the outer end of tube 84 is configured to receive stud 54 of base member 38 therein.

The numeral 86 refers to an upstanding end member which is positioned between the ends 20 and 42 of base members 16 and 38 respectively as will be described in detail hereinafter. End member 86 will be described as having a flat lower end 88, on upper end 90, a curved outer side wall 92, and an inner side wall 94 which is curved at its upper end. As seen, the outer side wall 92 of end member 86 has a curved portion 96 at its lower end. The outer side wall 92 of end member 86 has a curved portion 98 which extends upwardly and inwardly from curved portion 96. End wall member 86 has a central partition wall 100 which extends between the outer side wall 92 and the inner side wall 94. End member 86 includes a pair of hollow tubes 102 and 104 which extend horizontally outwardly from one side of wall 100. As will be explained hereinafter, the outer end of tube 102 is configured to receive stud 34 therein and the outer end of tube 104 is configured to receive stud 36 therein. A pair of hollow tubes 106 and 108 extend horizontally outwardly from the other side of wall 100 at the lower end thereof as will be explained hereinafter. The outer end of tube 106 is configured to receive stud 56 therein and the outer end of tube 108 is configured to receive stud 58 therein.

The wheel guard 10 is assembled and mounted on the machine 15 as will now be described. End members 60 and 86 are positioned at the inner side of base member 16 so that tubes 78, 80, 102 and 104 are aligned with studs 30, 32, 34 and 36 respectively. The end members 60 and 86 are then moved inwardly towards base member 16 so that the studs 30, 32, 34 and 36 are snap-fitted into tubes 78, 80, 102 and 104 respectively. The base member 16 with the end members 60 and 86 attached thereto are then placed on the floor at one side of the wheel so that the lower end 62 of base member 16 and the lower ends 62 and 88 of end members 60 and 86 rest on the floor. At that point, the base member 16 and the end members 60 and 86 will partially surround the wheel. At that time, the upper ends 64 and 90 of end members 60 and 86 respectively will be positioned above the rotational axis of the wheel. At that point, the distance between the upper ends 64 and 90 of end members 60 and 86 respectively will be less than the diameter of the associated wheel.

The base member 38 is then positioned at the other or inner side of the wheel so that the lower end of base member 38 rests on the floor and so that the studs 52, 54 56, and 58 are aligned with the tubes 78, 80, 106 and 108 respectively. The base member 38 is then moved inwardly with respect to end members 60 and 86 so that the studs 52, 54, 56 and 58 are snap-fitted into the tubes 78, 80, 106 and 108 respectively.

A second way of attaching the wheel guard 10 to the way is to first assemble the wheel guard 10 by securing the base member 16, the base member 38, and end members 60 and 86 together. The assembled wheel guard 10 is then positioned on the floor in its upright position. The machine 15 is then raised and positioned so that the associated wheel is positioned directly above the wheel guard 10. The machine 15 is then lowered so that the wheel engages the upper ends of the end members 60 and 86 and deflects the upper ends of the end members 60 and 86 outwardly so the wheel passes downwardly into the wheel guard. This mounting procedure will be used if the wheel guard 10 is of one-piece construction.

With the wheel guards 10 mounted on the wheels 12 and 14, if the machine 15 is moved forwardly, the wheel guards 10 on the caster wheel 12, upon engaging a wire or cable, as seen in FIG. 1, the wheel guard 10 will push the wire or cable forwardly or laterally from the machine 15 so that the wheels thereof do not have to pass over the wire or cable. If the machine 15 is moved rearwardly, the wheel guards 10 on the wheels 14, upon engaging a wire or cable, the wheel guards 10 will push the wire or cable rearwardly or laterally from the machine 15 so that the wheels thereof do not have to pass over the wire or cable.

The components of the wheel guard may also be screwed together or bolted together.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A guard for a wheel rotatably mounted on a machine or appliance with the wheel having a horizontal axle, comprising:
   a horizontally disposed first base member having a first end, a second end, a lower end and an upper end;
   said first base member being positioned at one side of the wheel;
   a horizontally disposed second base member having a first end, a second end, a lower end and an upper end;
   said second base member being horizontally spaced from said first base member and being positioned at the other side of the wheel;
   said upper ends of said first and second base members dwelling in a plane below the horizontal axle of the wheel;
   an upstanding first end member having a lower end, an upper end, a first side, a second side, an outer end wall with lower and upper ends, and an inner end wall with lower and upper ends;
   said outer end wall of said first end member extending upwardly and inwardly from said lower end thereof to said upper end thereof;
   said inner end wall of said first end member extending upwardly and inwardly from said lower end thereof to said upper end thereof;
   said lower end of said first end member being positioned between said first ends of said first and second base members;
   said upper end of first end member dwelling in a plane above said upper ends of said first and second base members;
   an upstanding second end member having a lower end, an upper end, a first side, a second side, an outer end wall with lower and upper ends, and an inner end wall with lower and upper ends;
   said outer end wall of said second end member extending upwardly and inwardly from said lower end thereof to said upper end thereof;
   said inner end wall of said second end member extending upwardly and inwardly from said lower end thereof to said upper end thereof;
   said lower end of said second end member being positioned between said second ends of said first and second base members;
   said upper end of said second end member dwelling in a plane above said upper ends of said first and second base members;
   said upper ends of said inner end walls of said first and second end members dwelling in a plane above the horizontal axis of the wheel; and
   said upper ends of said inner end walls of said first and second end members being spaced-apart a distance which is less than the diameter of the wheel.

2. The guard of claim 1 wherein said first ends of said first and second base members are selectively removably secured to said first end member and wherein said second ends of said first and second base members are selectively removably secured to said second end member.

3. The guard of claim 1 wherein said first ends of said first and second base members are selectively removably snap-fitted to said first end member and wherein said second ends of said first and second base members are selectively removably snap-fitted to said second end member.

4. The guard of claim 1 wherein the guard is of one-piece plastic construction.

5. The guard of claim 1 wherein said first and second ends of said first and second base members are curved.

6. The guard of claim 1 wherein said lower ends of said first and second base members are flat.

7. A guard for a wheel rotatably mounted on a machine or appliance with the wheel having a horizontal axle, a first side, a second side, an upper end and a lower end, comprising:
   a horizontally disposed base member having a flat lower end, an upper end, a first end, a second end, a first side and a second side;
   said base member having a rectangular opening formed therein configured to receive the lower end of the wheel therein;
   said first side of said base member being positioned at first side of the wheel;
   said second side of said base member being positioned at the second side of the wheel;
   said upper end of said base member dwelling in a plane below the horizontal axle of the wheel;

an upstanding first end member at said first end of said base member having a lower end, an upper end, a first side, a second side, an outer end wall with lower and upper ends, and an inner end wall with lower and upper ends;

said outer end wall of said first end member extending upwardly and inwardly from said lower end thereof to said upper end thereof;

said inner end wall of said first end member extending upwardly and inwardly from said lower end thereof to said upper end thereof;

said upper end of first end member dwelling in a plane above said upper end of said base member;

an upstanding second end member at said second end of said base member having a lower end, an upper end, a first side, a second side, an outer end wall with lower and upper ends, and an inner end wall with lower and upper ends;

said outer end wall of said second end member extending upwardly and inwardly from said lower end thereof to said upper end thereof;

said inner end wall of said second end member extending upwardly and inwardly from said lower end thereof to said upper end thereof;

said upper end of said second end member dwelling in a plane above said upper end of said base member;

said upper ends of said inner end walls of said first and second end members dwelling in a plane above the horizontal axis of the wheel; and said upper ends of said inner end walls of said first and second end members being spaced-apart a distance which is less than the diameter of the wheel.

8. The wheel guard of claim 7 wherein the guard is of one-piece construction.

9. A guard for a wheel rotatably mounted on a machine or appliance with the wheel having a horizontal axle, a first side, a second side, an upper end and a lower end, comprising:

a horizontally disposed base member having a lower end, an upper end, a first end, a second end, a first side and a second side;

said base member having a rectangular opening formed therein configured to receive the lower end of the wheel therein;

said first side of said base member being positioned at the first side of the wheel;

said second side of said base member being positioned at the second side of the wheel;

said upper end of said base member dwelling in a plane below the horizontal axle of the wheel;

an upstanding first end member at said first end of said base member;

said first end member having a lower end, an upper end, a first side and a second side;

said first end member extending upwardly and inwardly from said lower end thereof to said upper end thereof;

said upper end of first end member dwelling in a plane above said upper end of said base member;

an upstanding second end member at said second end of said base member;

said second end member having a lower end, an upper end, a first side and a second side;

said second end member extending upwardly and inwardly from said lower end thereof to said upper end thereof;

said upper end of said second end member dwelling in a plane above said upper end of said base member;

said upper ends of said first and second end members dwelling in a plane above the horizontal axis of the wheel; and said upper ends of said first and second end members being spaced-apart a distance which is less than the diameter of the wheel.

* * * * *